(12) United States Patent
Chang et al.

(10) Patent No.: US 9,229,197 B2
(45) Date of Patent: Jan. 5, 2016

(54) MOBILE DEVICE AND OPTICAL IMAGING LENS THEREOF

(71) Applicant: GENIUS ELECTRONIC OPTICAL CO., LTD., Taichung (TW)

(72) Inventors: Kuo-Wen Chang, Taichung (TW); Poche Lee, Taichung (TW); Wei-Yu Lo, Taichung (CN)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 0 days.

(21) Appl. No.: 14/543,808

(22) Filed: Nov. 17, 2014

(65) Prior Publication Data

US 2015/0116845 A1 Apr. 30, 2015

Related U.S. Application Data

(63) Continuation of application No. 13/847,456, filed on Mar. 19, 2013, now Pat. No. 8,934,181.

(30) Foreign Application Priority Data

Nov. 2, 2012 (TW) .............................. 101140812 A

(51) Int. Cl.
*G02B 9/60* (2006.01)
*G02B 13/18* (2006.01)
*G02B 13/00* (2006.01)
*G03B 13/32* (2006.01)
*G02B 3/04* (2006.01)
*G02B 5/00* (2006.01)

(52) U.S. Cl.
CPC .............. *G02B 13/0045* (2013.01); *G02B 9/60* (2013.01); *G03B 13/32* (2013.01); *G02B 3/04* (2013.01); *G02B 5/005* (2013.01); *G02B 13/18* (2013.01)

(58) Field of Classification Search
CPC ...... G02B 13/0045; G02B 9/60; G02B 13/18; G02B 3/04; G02B 5/005
USPC .................................. 359/714, 740, 763–765
See application file for complete search history.

(56) References Cited

U.S. PATENT DOCUMENTS

2012/0026369 A1* 2/2012 Sano et al. .................... 359/714

* cited by examiner

*Primary Examiner* — Evelyn A Lester
(74) *Attorney, Agent, or Firm* — Kilpatrick Townsend and Stockton LLP

(57) ABSTRACT

Present embodiments provide for a mobile device and an optical imaging lens thereof. The optical imaging lens comprises five lens elements positioned sequentially from an object side to an image side. Though controlling the convex or concave shape of the surfaces and/or the refracting power of the lens elements, the optical imaging lens shows better optical characteristics and the total length of the optical imaging lens is shortened.

20 Claims, 21 Drawing Sheets

| f(Focus)= 4.238 mm, HFOV(Half angular Image height of view)= 33.281 deg. ||||||||
|---|---|---|---|---|---|---|---|
| Surface # | | Radius | Thickness | Refractive index | Abbe number | Focus | Material |
| - | Object | ∞ | 600 | | | | |
| 100 | Aperture stop | ∞ | -0.305 | | | | |
| 111 | 1st lens element | 1.439 | 0.490 | 1.546 | 56.114 | 2.750 | plastic |
| 112 | | 30.401 | 0.100 | | | | |
| 121 | 2nd lens element | 5.798 | 0.260 | 1.637 | 23.340 | -5.428 | plastic |
| 122 | | 2.128 | 0.504 | | | | |
| 131 | 3rd lens element | -6.568 | 0.330 | 1.637 | 23.340 | -40.221 | plastic |
| 132 | | -9.004 | 0.362 | | | | |
| 141 | 4th lens element | -2.077 | 0.639 | 1.536 | 55.699 | 2.168 | plastic |
| 142 | | -0.826 | 0.254 | | | | |
| 151 | 5th lens element | -3.687 | 0.393 | 1.536 | 55.699 | -2.091 | plastic |
| 152 | | 1.671 | 0.503 | | | | |
| 161 | IR cut filter | ∞ | 0.300 | | | | |
| 162 | | ∞ | 0.741 | | | | |
| 170 | Image plane | ∞ | - | | | | |

FIG.4

| Aspherical parameters | | | | | |
|---|---|---|---|---|---|
| Surface # | 111 | 112 | 121 | 122 | 131 |
| K | -4.27E+00 | 0.00E+00 | 0.00E+00 | -7.08E+00 | 1.07E+00 |
| $a_4$ | 1.91E-01 | 5.83E-02 | 6.19E-03 | 6.70E-02 | -2.07E-01 |
| $a_6$ | -7.70E-02 | -2.87E-02 | 1.06E-01 | 6.93E-02 | -3.69E-02 |
| $a_8$ | 1.06E-02 | 1.84E-02 | -9.14E-02 | 1.14E-01 | 1.00E-01 |
| $a_{10}$ | 9.88E-02 | -5.28E-02 | -4.52E-02 | -2.99E-01 | 1.28E-02 |
| $a_{12}$ | -9.60E-02 | -1.68E-02 | 3.41E-02 | 2.76E-01 | - |
| $a_{14}$ | - | - | - | - | - |
| $a_{16}$ | - | - | - | - | - |
| $a_{18}$ | - | - | - | - | - |
| Surface # | 132 | 141 | 142 | 151 | 152 |
| K | 0.00E+00 | -5.00E+00 | -9.90E-01 | -3.76E+01 | -1.37E+01 |
| $a_4$ | -1.41E-01 | -6.95E-02 | 3.31E-01 | 5.26E-02 | -5.98E-02 |
| $a_6$ | 1.35E-02 | 5.83E-02 | -3.79E-01 | -1.41E-01 | 1.10E-02 |
| $a_8$ | 8.51E-02 | 1.33E-01 | 4.12E-01 | 1.29E-01 | -1.11E-03 |
| $a_{10}$ | -2.05E-02 | -1.62E-01 | -2.40E-01 | -7.09E-02 | -1.61E-04 |
| $a_{12}$ | 1.27E-04 | 6.70E-02 | 7.35E-02 | 2.44E-02 | 3.19E-05 |
| $a_{14}$ | - | -1.00E-02 | -1.12E-02 | -5.08E-03 | - |
| $a_{16}$ | - | - | 6.31E-04 | 5.79E-04 | - |
| $a_{18}$ | - | - | - | -2.78E-05 | - |

FIG.5

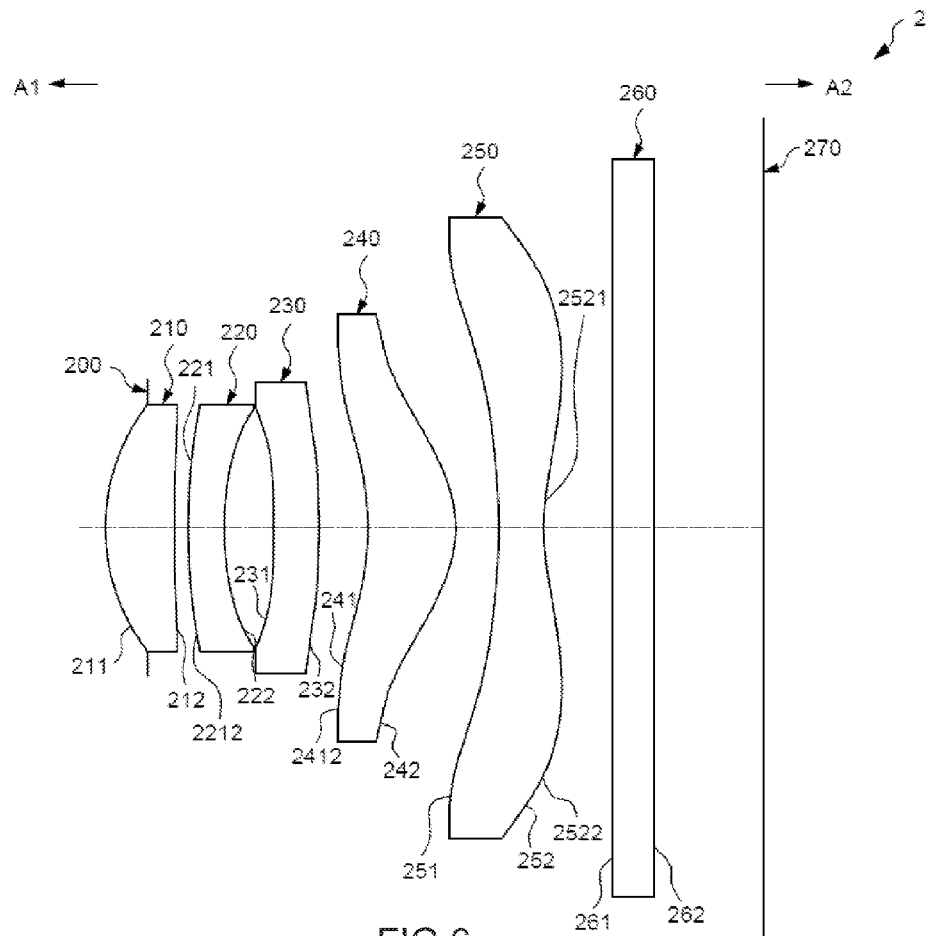
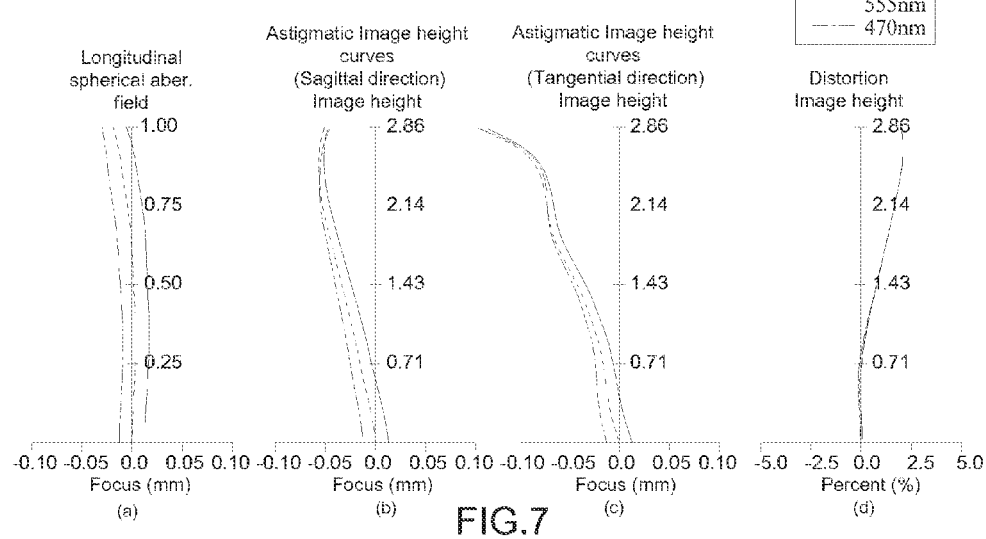
FIG.6
FIG.7

| f(Focus)= 4.011 mm,HFOV(Half angular Image height of view)= 37.716 deg. | | | | | | | |
|---|---|---|---|---|---|---|---|
| Surface # | | Radius | Thickness | Refractive index | Abbe number | Focus | Material |
| - | Object | ∞ | 600 | | | | |
| 200 | Aperture stop | ∞ | -0.305 | | | | |
| 211 | 1st lens element | 1.431 | 0.507 | 1.546 | 56.114 | 2.717 | plastic |
| 212 | | 35.187 | 0.100 | | | | |
| 221 | 2nd lens element | 5.911 | 0.260 | 1.637 | 23.340 | -5.089 | plastic |
| 222 | | 2.058 | 0.363 | | | | |
| 231 | 3rd lens element | -11.310 | 0.330 | 1.637 | 23.340 | -239.521 | plastic |
| 232 | | -12.355 | 0.355 | | | | |
| 241 | 4th lens element | -2.070 | 0.645 | 1.536 | 55.699 | 2.186 | plastic |
| 242 | | -0.830 | 0.313 | | | | |
| 251 | 5th lens element | -3.687 | 0.329 | 1.536 | 55.699 | -2.068 | plastic |
| 252 | | 1.636 | 0.503 | | | | |
| 261 | IR cut filter | ∞ | 0.300 | | | | |
| 262 | | ∞ | 0.668 | | | | |
| 270 | Image plane | ∞ | - | | | | |

FIG.8

| Aspherical parameters | | | | | |
|---|---|---|---|---|---|
| Surface # | 211 | 212 | 221 | 222 | 231 |
| K | -4.26E+00 | 0.00E+00 | 0.00E+00 | -7.16E+00 | 1.19E+01 |
| $a_4$ | 1.91E-01 | 5.77E-02 | 6.87E-03 | 6.60E-02 | -2.09E-01 |
| $a_6$ | -7.73E-02 | -3.06E-02 | 1.08E-01 | 6.70E-02 | -3.88E-02 |
| $a_8$ | 1.01E-02 | 1.57E-02 | -9.04E-02 | 1.12E-01 | 9.90E-02 |
| $a_{10}$ | 9.85E-02 | -5.43E-02 | -4.97E-02 | -2.94E-01 | 1.05E-02 |
| $a_{12}$ | -9.74E-02 | -1.68E-02 | 3.41E-02 | 2.76E-01 | - |
| $a_{14}$ | - | - | - | - | - |
| $a_{16}$ | - | - | - | - | - |
| $a_{18}$ | - | - | - | - | - |
| Surface # | 232 | 241 | 242 | 251 | 252 |
| K | 0.00E+00 | -5.05E+00 | -9.88E-01 | -3.76E+01 | -1.35E+01 |
| $a_4$ | -1.40E-01 | -6.95E-02 | 3.30E-01 | 5.25E-02 | -6.12E-02 |
| $a_6$ | 1.59E-02 | 5.84E-02 | -3.76E-01 | -1.41E-01 | 1.11E-02 |
| $a_8$ | 8.81E-02 | 1.33E-01 | 4.10E-01 | 1.29E-01 | -1.12E-03 |
| $a_{10}$ | -1.96E-02 | -1.62E-01 | -2.37E-01 | -7.09E-02 | -1.61E-04 |
| $a_{12}$ | 1.27E-03 | 6.70E-02 | 7.27E-02 | 2.44E-02 | 3.33E-05 |
| $a_{14}$ | - | -1.00E-02 | -1.11E-02 | -5.08E-03 | - |
| $a_{16}$ | - | - | 6.13E-04 | 5.79E-04 | - |
| $a_{18}$ | - | - | - | -2.78E-05 | - |

FIG.9

| f(Focus)= 4.256 mm, HFOV(Half angular Image height of view)= 33.102 deg. ||||||||
|---|---|---|---|---|---|---|---|
| Surface # | | Radius | Thickness | Refractive index | Abbe number | Focus | Material |
| -- | Object | ∞ | 600 | | | | |
| 300 | Aperture stop | ∞ | -0.305 | | | | |
| 311 | 1st lens element | 1.437 | 0.494 | 1.546 | 56.114 | 2.564 | plastic |
| 312 | | -47.719 | 0.100 | | | | |
| 321 | 2nd lens element | 8.454 | 0.260 | 1.637 | 23.340 | -4.517 | plastic |
| 322 | | 2.121 | 0.566 | | | | |
| 331 | 3rd lens element | -4.791 | 0.330 | 1.637 | 23.340 | -54.942 | plastic |
| 332 | | -5.700 | 0.362 | | | | |
| 341 | 4th lens element | -2.131 | 0.640 | 1.536 | 55.699 | 2.171 | plastic |
| 342 | | -0.832 | 0.246 | | | | |
| 351 | 5th lens element | -3.687 | 0.411 | 1.536 | 55.699 | -2.072 | plastic |
| 352 | | 1.653 | 0.503 | | | | |
| 361 | IR cut filter | ∞ | 0.300 | | | | |
| 362 | | ∞ | 0.698 | | | | |
| 370 | Image plane | ∞ | - | | | | |

FIG.12

| Aspherical parameters | | | | | |
|---|---|---|---|---|---|
| Surface # | 311 | 312 | 321 | 322 | 331 |
| K | -4.34E+00 | 0.00E+00 | 0.00E+00 | -6.81E+00 | -1.80E+00 |
| $a_4$ | 1.91E-01 | 5.73E-02 | 5.80E-03 | 6.81E-02 | -2.05E-01 |
| $a_6$ | -7.65E-02 | -2.51E-02 | 1.02E-01 | 6.95E-02 | -3.39E-02 |
| $a_8$ | 1.22E-02 | 2.61E-02 | -9.44E-02 | 1.16E-01 | 1.04E-01 |
| $a_{10}$ | 1.02E-01 | -5.03E-02 | -3.65E-02 | -2.96E-01 | 1.86E-02 |
| $a_{12}$ | -9.60E-02 | -1.68E-02 | 3.41E-02 | 2.76E-01 | - |
| $a_{14}$ | - | - | - | - | - |
| $a_{16}$ | - | - | - | - | - |
| $a_{18}$ | - | - | - | - | - |
| Surface # | 332 | 341 | 342 | 351 | 352 |
| K | 0.00E+00 | -4.58E+00 | -9.90E-01 | -3.76E+01 | -1.34E+01 |
| $a_4$ | -1.46E-01 | -7.00E-02 | 3.32E-01 | 5.28E-02 | -5.87E-02 |
| $a_6$ | 1.17E-02 | 5.85E-02 | -3.80E-01 | -1.41E-01 | 1.01E-02 |
| $a_8$ | 8.64E-02 | 1.33E-01 | 4.14E-01 | 1.29E-01 | -1.01E-03 |
| $a_{10}$ | -2.14E-02 | -1.62E-01 | -2.41E-01 | -7.09E-02 | -1.43E-04 |
| $a_{12}$ | -6.92E-05 | 6.70E-02 | 7.41E-02 | 2.44E-02 | 2.74E-05 |
| $a_{14}$ | - | -1.00E-02 | -1.13E-02 | -5.08E-03 | - |
| $a_{16}$ | - | - | 6.39E-04 | 5.79E-04 | - |
| $a_{18}$ | - | - | - | -2.78E-05 | - |

FIG.13

| f(Focus)= 4.219 mm,HFOV(Half angular Image height of view)= 33.624 deg. |||||||
|---|---|---|---|---|---|---|---|
| Surface # | | Radius | Thickness | Refractive index | Abbe number | Focus | Material |
| - | Object | ∞ | 600 | | | | |
| 400 | Aperture stop | ∞ | -0.305 | | | | |
| 411 | 1st lens element | 1.429 | 0.506 | 1.546 | 56.114 | 2.477981 | plastic |
| 412 | | -22.312 | 0.100 | | | | |
| 421 | 2nd lens element | 10.691 | 0.260 | 1.637 | 23.340 | -3.95044 | plastic |
| 422 | | 2.018 | 0.481 | | | | |
| 431 | 3rd lens element | -5.574 | 0.330 | 1.637 | 23.340 | -500.931 | plastic |
| 432 | | -5.804 | 0.385 | | | | |
| 441 | 4th lens element | -2.194 | 0.649 | 1.536 | 55.699 | 2.178309 | plastic |
| 442 | | -0.841 | 0.299 | | | | |
| 451 | 5th lens element | -3.687 | 0.308 | 1.536 | 55.699 | -2.06689 | plastic |
| 452 | | 1.631 | 0.503 | | | | |
| 461 | IR cut filter | ∞ | 0.300 | | | | |
| 462 | | ∞ | 0.733 | | | | |
| 470 | Image plane | ∞ | - | | | | |

FIG.16

| Aspherical parameters | | | | | |
|---|---|---|---|---|---|
| Surface # | 411 | 412 | 421 | 422 | 431 |
| K | -4.35E+00 | 0.00E+00 | 0.00E+00 | -6.49E+00 | -2.35E+00 |
| $a_4$ | 1.90E-01 | 5.60E-02 | 5.54E-03 | 6.77E-02 | -2.04E-01 |
| $a_6$ | -7.69E-02 | -2.31E-02 | 9.95E-02 | 6.32E-02 | -3.67E-02 |
| $a_8$ | 1.20E-02 | 3.03E-02 | -9.57E-02 | 1.14E-01 | 1.03E-01 |
| $a_{10}$ | 1.04E-01 | -5.11E-02 | -2.76E-02 | -2.81E-01 | 1.91E-02 |
| $a_{12}$ | -9.60E-02 | -1.68E-02 | 3.41E-02 | 2.76E-01 | - |
| $a_{14}$ | - | - | - | - | - |
| $a_{16}$ | - | - | - | - | - |
| $a_{18}$ | - | - | - | - | - |
| Surface # | 432 | 441 | 442 | 451 | 452 |
| K | 0.00E+00 | -4.76E+00 | -9.87E-01 | -3.76E+01 | -1.35E+01 |
| $a_4$ | -1.46E-01 | -7.07E-02 | 3.32E-01 | 5.16E-02 | -6.28E-02 |
| $a_6$ | 1.30E-02 | 5.81E-02 | -3.80E-01 | -1.41E-01 | 1.02E-02 |
| $a_8$ | 8.67E-02 | 1.33E-01 | 4.15E-01 | 1.29E-01 | -1.05E-03 |
| $a_{10}$ | -2.16E-02 | -1.62E-01 | -2.41E-01 | -7.09E-02 | -1.41E-04 |
| $a_{12}$ | -1.37E-04 | 6.70E-02 | 7.41E-02 | 2.44E-02 | 2.96E-05 |
| $a_{14}$ | - | -1.00E-02 | -1.13E-02 | -5.08E-03 | - |
| $a_{16}$ | - | - | 6.38E-04 | 5.79E-04 | - |
| $a_{18}$ | - | - | - | -2.78E-05 | - |

FIG.17

| f(Focus)= 4.218 mm,HFOV(Half angular Image height of view)= 33.632 deg. ||||||||
|---|---|---|---|---|---|---|---|
| Surface # | | Radius | Thickness | Refractive index | Abbe number | Focus | Material |
| - | Object | ∞ | 600 | | | | |
| 500 | Aperture stop | ∞ | -0.305 | | | | |
| 511 | 1st lens element | 1.429 | 0.506 | 1.546 | 56.114 | 2.478 | plastic |
| 512 | | -22.238 | 0.100 | | | | |
| 521 | 2nd lens element | 10.710 | 0.260 | 1.637 | 23.340 | -3.948 | plastic |
| 522 | | 2.018 | 0.480 | | | | |
| 531 | 3rd lens element | -5.590 | 0.330 | 1.637 | 23.340 | -528.669 | plastic |
| 532 | | -5.815 | 0.384 | | | | |
| 541 | 4th lens element | -2.194 | 0.649 | 1.536 | 55.699 | 2.178 | plastic |
| 542 | | -0.841 | 0.299 | | | | |
| 551 | 5th lens element | -3.687 | 0.309 | 1.536 | 55.699 | -2.067 | plastic |
| 552 | | 1.631 | 0.503 | | | | |
| 561 | IR cut filter | ∞ | 0.300 | | | | |
| 562 | | ∞ | 0.733 | | | | |
| 570 | Image plane | ∞ | - | | | | |

FIG.20

| Aspherical parameters | | | | | |
|---|---|---|---|---|---|
| Surface # | 511 | 512 | 521 | 522 | 531 |
| K | -4.35E+00 | 0.00E+00 | 0.00E+00 | -6.49E+00 | -2.37E+00 |
| $a_4$ | 1.90E-01 | 5.60E-02 | 5.54E-03 | 6.77E-02 | -2.04E-01 |
| $a_6$ | -7.69E-02 | -2.31E-02 | 9.95E-02 | 6.31E-02 | -3.67E-02 |
| $a_8$ | 1.20E-02 | 3.03E-02 | -9.57E-02 | 1.14E-01 | 1.03E-01 |
| $a_{10}$ | 1.04E-01 | -5.11E-02 | -2.75E-02 | -2.81E-01 | 1.91E-02 |
| $a_{12}$ | -9.60E-02 | -1.68E-02 | 3.41E-02 | 2.76E-01 | - |
| $a_{14}$ | - | - | - | - | - |
| $a_{16}$ | - | - | - | - | - |
| $a_{18}$ | - | - | - | - | - |
| Surface # | 532 | 541 | 542 | 551 | 552 |
| K | 0.00E+00 | -4.76E+00 | -9.87E-01 | -3.76E+01 | -1.35E+01 |
| $a_4$ | -1.46E-01 | -7.07E-02 | 3.32E-01 | 5.16E-02 | -6.28E-02 |
| $a_6$ | 1.30E-02 | 5.81E-02 | -3.80E-01 | -1.41E-01 | 1.02E-02 |
| $a_8$ | 8.67E-02 | 1.33E-01 | 4.15E-01 | 1.29E-01 | -1.05E-03 |
| $a_{10}$ | -2.16E-02 | -1.62E-01 | -2.41E-01 | -7.09E-02 | -1.41E-04 |
| $a_{12}$ | -1.33E-04 | 6.70E-02 | 7.41E-02 | 2.44E-02 | 2.96E-05 |
| $a_{14}$ | - | -1.00E-02 | -1.13E-02 | -5.08E-03 | - |
| $a_{16}$ | - | - | 6.38E-04 | 5.79E-04 | - |
| $a_{18}$ | - | - | - | -2.78E-05 | - |

FIG.21

| f(Focus)= 4.292 mm,HFOV(Half angular Image height of view)= 32.915 deg. ||||||||
|---|---|---|---|---|---|---|---|
| Surface # | | Radius | Thickness | Refractive index | Abbe number | Focus | Material |
| - | Object | ∞ | 600 | | | | |
| 600 | Aperture stop | ∞ | -0.305 | | | | |
| 611 | 1st lens element | 1.432 | 0.506 | 1.546 | 56.114 | 2.500 | plastic |
| 612 | | -25.456 | 0.100 | | | | |
| 621 | 2nd lens element | 9.866 | 0.260 | 1.637 | 23.340 | -4.015 | plastic |
| 622 | | 2.011 | 0.466 | | | | |
| 631 | 3rd lens element | -5.220 | 0.330 | 1.637 | 23.340 | -218.726 | plastic |
| 632 | | -5.556 | 0.389 | | | | |
| 641 | 4th lens element | -2.148 | 0.640 | 1.536 | 55.699 | 2.194 | plastic |
| 642 | | -0.839 | 0.265 | | | | |
| 651 | 5th lens element | -3.687 | 0.357 | 1.536 | 55.699 | -2.109 | plastic |
| 652 | | 1.686 | 0.503 | | | | |
| 661 | IR cut filter | ∞ | 0.300 | | | | |
| 662 | | ∞ | 0.811 | | | | |
| 670 | Image plane | ∞ | - | | | | |

FIG.24

| Aspherical parameters | | | | | |
|---|---|---|---|---|---|
| Surface # | 611 | 612 | 621 | 622 | 631 |
| K | -4.39E+00 | 0.00E+00 | 0.00E+00 | -6.37E+00 | -9.94E-01 |
| $a_4$ | 1.90E-01 | 5.60E-02 | 6.03E-03 | 6.76E-02 | -2.06E-01 |
| $a_6$ | -7.65E-02 | -2.25E-02 | 1.00E-01 | 6.24E-02 | -3.43E-02 |
| $a_8$ | 1.27E-02 | 3.15E-02 | -9.56E-02 | 1.16E-01 | 1.03E-01 |
| $a_{10}$ | 1.05E-01 | -5.12E-02 | -2.93E-02 | -2.83E-01 | 1.80E-02 |
| $a_{12}$ | -9.60E-02 | -1.68E-02 | 3.41E-02 | 2.76E-01 | - |
| $a_{14}$ | - | - | - | - | - |
| $a_{16}$ | - | - | - | - | - |
| $a_{18}$ | - | - | - | - | - |
| Surface # | 632 | 641 | 642 | 651 | 652 |
| K | 0.00E+00 | -4.48E+00 | -9.94E-01 | -3.76E+01 | -1.44E+01 |
| $a_4$ | -1.49E-01 | -7.01E-02 | 3.39E-01 | 5.35E-02 | -6.37E-02 |
| $a_6$ | 1.19E-02 | 5.86E-02 | -3.90E-01 | -1.41E-01 | 1.15E-02 |
| $a_8$ | 8.86E-02 | 1.33E-01 | 4.29E-01 | 1.29E-01 | -1.21E-03 |
| $a_{10}$ | -2.25E-02 | -1.62E-01 | -2.52E-01 | -7.09E-02 | -1.72E-04 |
| $a_{12}$ | -3.75E-04 | 6.69E-02 | 7.80E-02 | 2.44E-02 | 3.76E-05 |
| $a_{14}$ | - | -1.01E-02 | -1.20E-02 | -5.08E-03 | - |
| $a_{16}$ | - | - | 6.79E-04 | 5.79E-04 | - |
| $a_{18}$ | - | - | - | -2.78E-05 | - |

FIG.25

| Embodiment | 1st Embodiment | 2nd Embodiment | 3rd Embodiment | 4th Embodiment | 5th Embodiment | 6th Embodiment |
|---|---|---|---|---|---|---|
| $AAG/CT_5$ | 3.104 | 3.441 | 3.100 | 4.098 | 4.084 | 3.415 |
| $AGL_{23}\text{-}AGL_{45}$ | 0.250 | 0.050 | 0.320 | 0.182 | 0.182 | 0.201 |
| EFL/ALT | 2.006 | 1.936 | 1.994 | 2.054 | 2.053 | 2.050 |
| $CT_4/BFL$ | 0.414 | 0.439 | 0.427 | 0.423 | 0.423 | 0.397 |
| ALT/BFL | 1.369 | 1.408 | 1.423 | 1.338 | 1.339 | 1.297 |
| $CT_4/AGL_{23}$ | 1.268 | 1.778 | 1.132 | 1.351 | 1.352 | 1.374 |

FIG.26

MOBILE DEVICE AND OPTICAL IMAGING LENS THEREOF

CROSS-REFERENCES TO RELATED APPLICATIONS

This application is a continuation of U.S. patent application Ser. No. 13/847,456, filed on Mar. 19, 2013, which claims priority to Taiwan Patent Application No. 101140812, filed on Nov. 2, 2012, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having five lens elements and an optical imaging lens thereof.

BACKGROUND OF THE INVENTION

Dimension reduction is the major consideration for design an optical imaging lens in recent years. When reducing the length of the optical imaging lens, however, achieving good optical characteristics becomes a challenging problem.

U.S. Pat. Nos. 7,480,105, 7,639,432, 7,486,449, and 7,684,127 all disclosed an optical imaging lens constructed with an optical imaging lens having five lens elements. The transition of refracting powers of the first three lens elements in U.S. Pat. No. 7,480,105 is negative-positive-negative, and those in U.S. Pat. No. 7,639,432, U.S. Pat. No. 7,486,449, and U.S. Pat. No. 7,684,127 are negative-positive-positive, negative-negative-positive, and negative-negative-positive respectively. However, such configurations still fail to achieve good optical characteristics, and further, fail to reduce the size of the whole system, because the lengths of the optical imaging lenses thereof fall into the range of 10~18 mm.

U.S. Patent Publication No. 2011/0013069, and 2011/0249346, and U.S. Pat. No. 8,000,030 all disclosed an optical imaging lens constructed with an optical imaging lens having five lens elements. The transition of refracting powers of the first three lens elements in these three documents is the better positive-negative-negative. However, the configurations of the lens elements thereof are unfavorable for improving the optical aberrations and meanwhile shortening the length of the optical imaging lens, therefore, for achieving better imaging quality, the lengths of the imaging lens are unable to be shortened. For example, the lengths of some imaging lens reach 6.0 mm, and this needs for improvement.

Therefore, there is needed to develop optical imaging lens with a shorter length, while also having good optical characters.

BRIEF SUMMARY OF THE INVENTION

An object of the present invention is to provide a mobile device and an optical imaging lens thereof. With controlling the convex or concave shape and/or the refracting power of the surfaces of the lens elements, the length of the optical imaging lens is shortened and meanwhile the good optical characteristics, and system functionality are sustained.

In an exemplary embodiment, an optical imaging lens comprises, sequentially from an object side to an image side, comprises first, second, third, fourth and fifth lens elements, each of said first, second, third, fourth and fifth lens elements having an object-side surface facing toward the object side and an image-side surface facing toward the image side, wherein: the first lens element has positive refracting power, and the object-side surface thereof is a convex surface; the second lens element has negative refracting power; the third lens element has negative refracting power; the object-side surface of the fifth lens element comprises a concave portion in a vicinity of the optical axis, and the image-side surface of the fifth lens element comprises a convex portion in a vicinity of a periphery of the fifth lens element; and the optical imaging lens as a whole has only the five lens elements having refracting power.

In another exemplary embodiment, some equation (s), such as those relating to the difference or the ratio among parameters can be taken into consideration. For example, the sum of all four air gaps from the first lens element to the fifth lens element along the optical axis, AAG, and a central thickness of the fifth lens element along the optical axis, $CT_5$, could be controlled to satisfy the equation as follows:

$$AAG/CT_5 \geq 3.0 \qquad \text{Equation (1); or}$$

An air gap between the second lens element and the third lens element along the optical axis, $AGL_{23}$, and an air gap between the fourth lens element and the fifth lens element along the optical axis, $AGL_{45}$, could be controlled to satisfy the equation as follows:

$$0 \leq AGL_{23} - AGL_{45} \leq 0.4 \text{ (mm)} \qquad \text{Equation (2); or}$$

An effective focal length of the optical imaging lens, EFL, and the total thickness of all five lens elements, ALT, could be controlled to satisfy the equation (s) as follows:

$$EFL/ALT \geq 1.8 \qquad \text{Equation (3); or}$$

$$EFL/ALT \geq 1.9 \qquad \text{Equation (3'); or}$$

A central thickness of the fourth lens element along the optical axis, $CT_4$, and a back focal length of the optical imaging lens, BFL, could be controlled to satisfy the equation (s) as follows:

$$CT_4/BFL \leq 0.7 \qquad \text{Equation (4); or}$$

$$CT_4/BFL \leq 0.5 \qquad \text{Equation (4'); or}$$

ALT and BFL could be controlled to satisfy the equation (s) as follows:

$$ALT/BFL \leq 2.0 \qquad \text{Equation (5); or}$$

$$ALT/BFL \leq 1.5 \qquad \text{Equation (5'); or}$$

$CT_4$ and $AGL_{23}$ could be controlled to satisfy the equation as follows:

$$CT_4/AGL_{23} \leq 3.0 \qquad \text{Equation (6).}$$

Aforesaid exemplary embodiments are not limited and could be selectively incorporated in other embodiments described herein.

In some exemplary embodiments, more details about the convex or concave surface structure could be incorporated for one specific lens element or broadly for plural lens elements to enhance the control for the system performance and/or resolution. For example, the object-side surface of the fourth lens element could comprise a concave portion in a vicinity of a periphery of the fourth lens element, or the object-side surface of the second lens element could comprise a convex portion in a vicinity of a periphery of the second lens element.

In another exemplary embodiment, a mobile device comprising a housing and a photography module positioned in the housing is provided. The photography module comprises any of aforesaid example embodiments of optical imaging lens, a lens barrel, a module housing unit, a substrate, and an image sensor. The lens barrel is for positioning the optical imaging lens, the module housing unit is for positioning the lens barrel, the substrate is for positioning the module housing unit, and the image sensor is positioned at the image-side of the optical imaging lens.

In some exemplary embodiments, the module housing unit optionally comprises a seat element for positioning the lens barrel and moving along with the optical axisof the optical imaging lens.

Through controlling the convex or concave shape of the surfaces and/or the refraction power of the lens element(s), the mobile device and the optical imaging lens thereof in exemplary embodiments achieve good optical characters and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of spherical data of a first embodiment of the optical imaging lens according to the present disclosure;

FIG. 6 is a cross-sectional view of a second embodiment of an optical imaging lens having five lens elements according to the present disclosure;

FIG. 7 is a chart of longitudinal spherical aberration and other kinds of optical aberrations of a second embodiment of the optical imaging lens according to the present disclosure;

FIG. 8 is a table of optical data for each lens element of the optical imaging lens of a second embodiment of the present disclosure;

FIG. 9 is a table of spherical data of a second embodiment of the optical imaging lens according to the present disclosure;

FIG. 12 is a table of optical data for each lens element of the optical imaging lens of a third embodiment of the present disclosure;

FIG. 13 is a table of a spherical data of a third embodiment of the optical imaging lens according to the present disclosure;

FIG. 16 is a table of optical data for each lens element of the optical imaging lens of a fourth embodiment of the present disclosure;

FIG. 17 is a table of a spherical data of a fourth embodiment of the optical imaging lens according to the present disclosure;

FIG. 20 is a table of optical data for each lens element of the optical imaging lens of a fifth embodiment of the present disclosure;

FIG. 21 is a table of a spherical data of a fifth embodiment of the optical imaging lens according to the present disclosure;

FIG. 24 is a table of optical data for each lens element of the optical imaging lens of a sixth embodiment of the present disclosure;

FIG. 25 is a table of a spherical data of a sixth embodiment of the optical imaging lens according to the present disclosure;

FIG. 26 is a table for the values of $AAG/CT_5$, $AGL_{23}-AGL_{45}$, $EFL/ALT$, $CT_4/BFL$, $ALT/BFL$ and $CT_4/AGL_{23}$ of all six example embodiments;

DETAILED DESCRIPTION OF THE INVENTION

Figure 1:
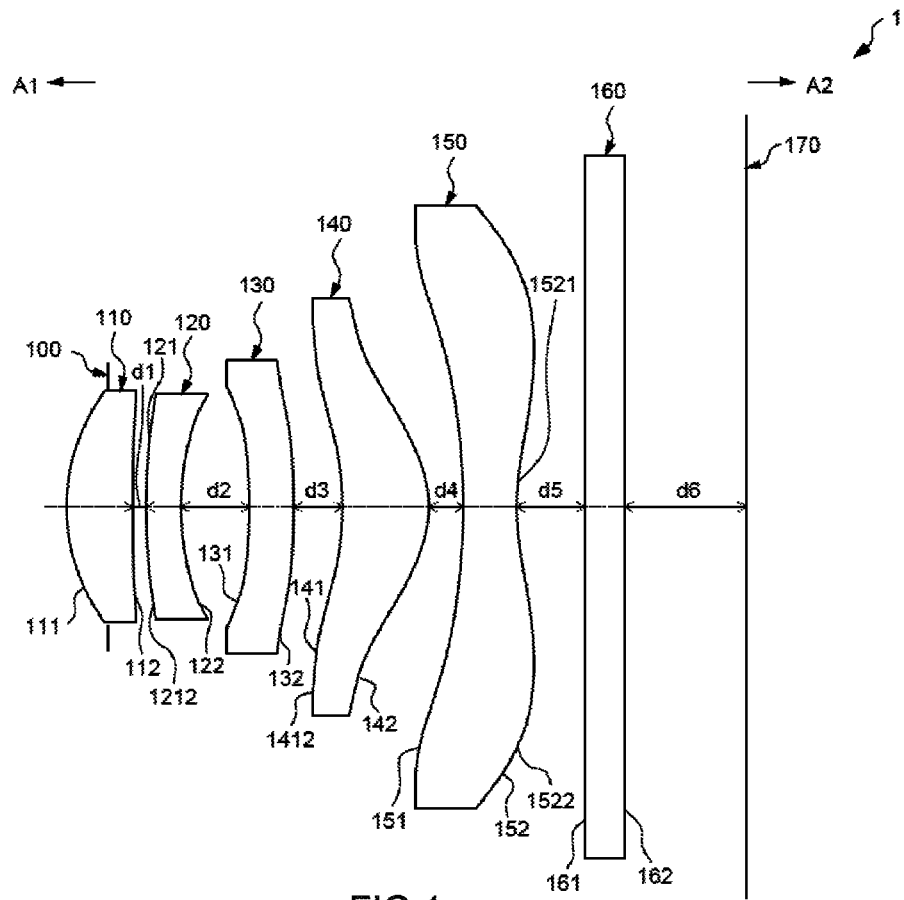
FIG. 1 is a cross-sectional view of a first embodiment of an optical imaging lens having five lens elements according to the present disclosure.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Example embodiments of an optical imaging lens may comprise an aperture stop, a first lens element, a second lens element, a third lens element, a fourth lens element, and a fifth lens element, each of the lens elements has an object-side surface facing toward the object side and an image-side surface facing toward the image side. These lens elements may be arranged sequentially from an object side to an image side, and example embodiments of the lens as a whole may comprise the five lens elements having refracting power. In an example embodiment: the first lens element has positive refracting power, and the object-side surface thereof is a convex surface; the second lens element has negative refracting power; the third lens element has negative refracting power; the object-side surface of the fifth lens element comprises a concave portion in a vicinity of the optical axis, and the image-side surface of the fifth lens element comprises a convex portion in a vicinity of a periphery of the fifth lens element; and the optical imaging lens as a whole has only the five lens elements having refracting power.

Preferably, the lens elements are designed in light of the optical characteristics and the length of the optical imaging lens. For example, the first lens element having positive refracting power provides the light converge ability required in the optical imaging lens. Both the second lens element and the third lens element having negative refracting power could eliminate the aberration of the optical lens. With a further concave portion in a vicinity of the optical axis on the object-side surface of the fifth lens element and a convex portion in a vicinity of a periphery on the image-side surface thereof, the aberration of the optical lens could be eliminated. Additionally, if the second lens element is designed to have convex portion in a vicinity of a periphery of the second lens element on the object-side surface thereof and/or the fourth lens element is designed to have a concave portion in a vicinity of a periphery of the fourth lens element on the object-side surface thereof, it could assist in reducing aberration as well.

In another exemplary embodiment, other related parameters, such as a central thickness of a lens element along the optical axis and or the ratio among a central thickness of a lens element along the optical axis and the sum of all air gaps. For example, the sum of all four air gaps from the first lens element to the fifth lens element along the optical axis, AAG, and a central thickness of the fifth lens element along the optical axis, $CT_5$, could be controlled to satisfy the equation as follows:

$$AAG/CT_5 \geq 3.0 \qquad \text{Equation (1); or}$$

An air gap between the second lens element and the third lens element along the optical axis, $AGL_{23}$, and an air gap between the fourth lens element and the fifth lens element along the optical axis, $AGL_{45}$, could be controlled to satisfy the equation as follows:

$$0 \leq AGL_{23} - AGL_{45} \leq 0.4 \text{ (mm)} \qquad \text{Equation (2); or}$$

An effective focal length of the optical imaging lens, EFL, and the total thickness of all five lens elements, ALT, could be controlled to satisfy the equation (s) as follows:

$$EFL/ALT \geq 1.8 \qquad \text{Equation (3); or}$$

$$EFL/ALT \geq 1.9 \qquad \text{Equation (3'); or}$$

A central thickness of the fourth lens element along the optical axis, $CT_4$, and a back focal length of the optical imaging lens, BFL, could be controlled to satisfy the equation (s) as follows:

$$CT_4/BFL \leq 0.7 \qquad \text{Equation (4); or}$$

$$CT_4/BFL \leq 0.5 \qquad \text{Equation (4'); or}$$

ALT and BFL could be controlled to satisfy the equation (s) as follows:

$$ALT/BFL \leq 2.0 \qquad \text{Equation (5); or}$$

$$ALT/BFL \leq 1.5 \qquad \text{Equation (5'); or}$$

$CT_4$ and $AGL_{23}$ could be controlled to satisfy the equation as follows:

$$CT_4/AGL_{23} \leq 3.0 \qquad \text{Equation (6).}$$

Aforesaid exemplary embodiments are not limited and could be selectively incorporated in other embodiments described herein.

Reference is now made to equation (1). The value of $AAG/CT_5$ is preferable greater than or equal to 3 to satisfy equation (1). This is because if the thickness of the fifth lens element along the optical axis is thin enough (i.e. $CT_5$ is small enough), and a convex portion in a vicinity of a periphery of the fifth lens element on the image-side surface thereof is formed, the refracting power around the optical axis and the periphery will be different to converge the light on the same plane to improve the image quality. Although AAG and $CT_5$ is shrank to meet modern thinner-and-slimmer design, if $CT_5$ is shrank in a more rate than AAG is (i.e. AAG is bigger), the effect to improve the image quality is quite well. Additionally, the value of $AAG/CT_5$ is suggested to within 3~10.

Reference is now made to equation (2). The value of $AGL_{23} - AGL_{45}$ is preferable greater than or equal to 0 (mm), i.e. the air gap between the second and third lens elements is greater than that between the fourth and fifth lens element. This is because the negative refracting power of the second lens element for dispersing light requires more distance between the second and third lens elements for dispersing light onto a proper level, which will improve the image quality, before the light entering the third lens element. Shortening the air gap between the fourth and fifth lens elements will assist in shortening the length of the optical imaging lens. Therefore, it is suggested that the value of $AGL_{23} - AGL_{45}$ is greater than or equal to 0 (mm), but not too large, preferably, between 0~0.4 (mm) to satisfy equation (2).

Reference is now made to equation (3). The value of EFL/ALT is preferable greater than or equal to 1.8. Shortening EFL is helpful to reduce the distance for focusing light and the length of the optical imaging lens. However, EFL will change along with ALT. If EFL/ALT is greater than 1.8, both EFL and ALT will be a proper value, preferably, EFL/ALT is between 1.9~5.0 to satisfy equation (3) or (3').

Reference is now made to equation (4). The value of $CT_4/BFL$ is preferable smaller than or equal to 0.7 to satisfy equation (4). This is because shortening $CT_4$ will help for shortening the length of the optical imaging lens. The value of BFL is benefit to be controlled for receiving an infrared cut filter. Preferably, $CT_4/BFL$ satisfies Equation (4), and additionally it may be further restricted in 0.1~0.5.

Reference is now made to equation (5). The value of ALT/BFL is preferable smaller than or equal to 2.0 to satisfy equation (5). This is because shortening ALT will help for shortening the length of the optical imaging lens to meet the modern trend. However, between the fifth lens element and an imaging plane (the distance between both along the optical axis is BFL), it may be required enough space for receiving an infrared cut filter for some implementations. Therefore, if the value of ALT/BFL is greater than 2.0, this may be means an excessive ALT or a scarce BFL, and both fail to meet the modern trend. Preferably, ALT/BFL satisfies Equation (5), and additionally it may be further restricted in 0.2~1.5.

Reference is now made to equation (6). The value of $CT_4/AGL_{23}$ is preferable smaller than or equal to 3.0 to satisfy equation (6). This is because shortening $CT_4$ will help for shortening the length of the optical imaging lens, and the value of $AGL_{23}$ is benefit to be controlled for allowing the light dispersed onto a proper level before entering into the third lens element. Preferably, $CT_4/AGL_{23}$ may be further restricted in 0.5~3.0.

When implementing example embodiments, more details about the convex or concave surface structure and/or the refracting power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Figure 2:
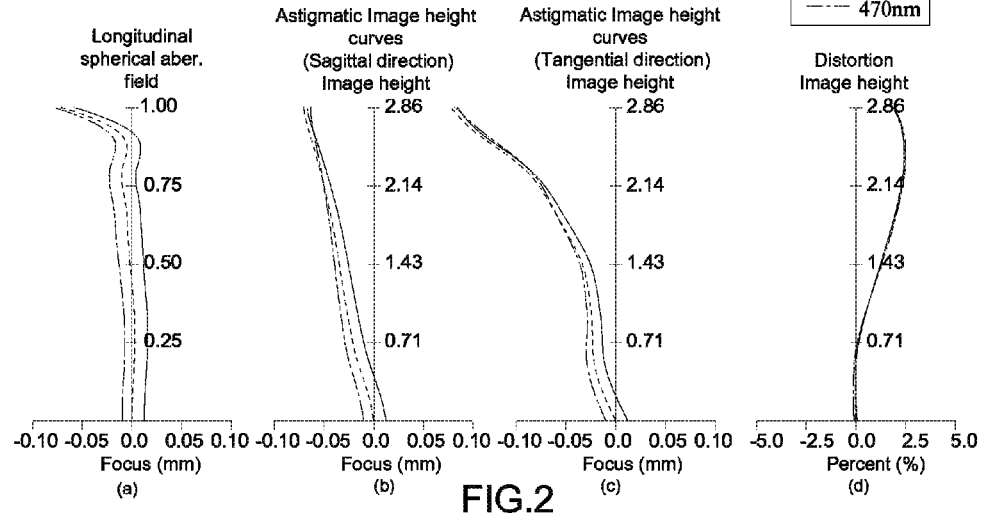
FIG. 2 is a chart of longitudinal spherical aberration and other kinds of optical aberrations of a first embodiment of the optical imaging lens according to the present disclosure.
Figure 3:
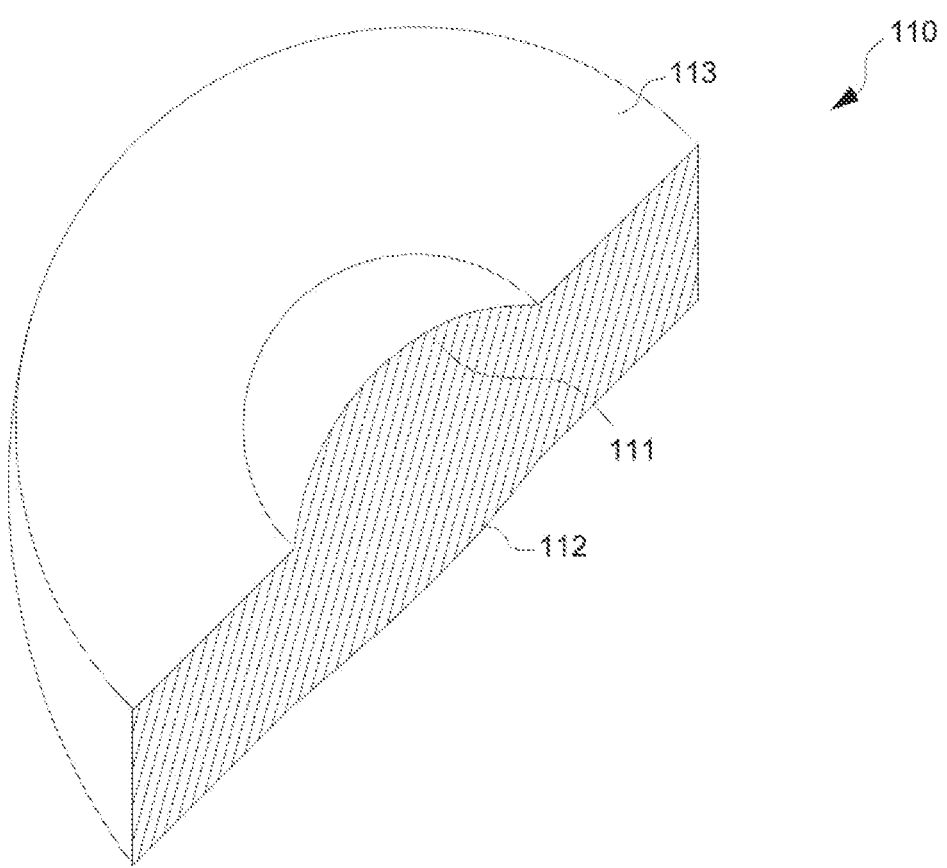
FIG. 3 is a cross-sectional view of a lens element of the optical imaging lens of an example embodiment of the present disclosure.

Several exemplary embodiments and associated optical data will now be provided for illustrating example embodiments of optical imaging lens with good optical characters and a shortened length. Reference is now made to FIGS. 1-5. FIG. 1 illustrates an example cross-sectional view of an optical imaging lens 1 having five lens elements of the optical imaging lens according to a first example embodiment. FIG. 2 shows example charts of longitudinal spherical aberration and other kinds of optical aberrations of the optical imaging lens 1 according to an example embodiment. FIG. 3 depicts another example cross-sectional view of a lens element of the optical imaging lens 1 according to an example embodiment. FIG. 4 illustrates an example table of optical data of each lens element of the optical imaging lens 1 according to an example embodiment. FIG. 5 depicts an example table of a spherical data of the optical imaging lens 1 according to an example embodiment.

As shown in FIG. 1, the optical imaging lens 1 of the present embodiment comprises, in order from an object side A1 to an image side A2, an aperture stop 100 positioned before a first lens element 110, the first lens element 110, a second lens element 120, a third lens element 130, a fourth lens element 140, a fifth lens element 150. A filtering unit 160 and an image plane 170 of an image sensor are positioned at the image side A2 of the optical lens 1. Each of the first, second, third, fourth, fifth lens elements 110, 120, 130, 140, 150 and the filtering unit 160 has an object-side surface 111/121/131/141/151/161 facing toward the object side A1 and an image-side surface 112/122/132/142/152/162 facing toward the image side A2.

The example embodiment of the filtering unit 160 illustrated is an IR cut filter (infrared cut filter) positioned between the fifth lens element 150 and an image plane 170. The filtering unit 160 selectively absorbs light with specific wavelength from the light passing optical imaging lens 1. For example, IR light is absorbed, and this will prohibit the IR light which is not seen by human eyes from producing an image on the image plane 170.

Exemplary embodiments of each lens elements of the optical imaging lens 1 will now be described with reference to the drawings.

An example embodiment of the first lens element 110 may have positive refracting power, which may be constructed by plastic material. The object-side surface 111 is a convex surface and the image-side surface 112 is a concave surface.

The second lens element 120 may have negative refracting power, which may be constructed by plastic material. The object-side surface 121 is a convex surface and the image-side surface 122 is a concave surface. The object-side surface 121 has a convex portion 1212 in a vicinity of a periphery of the second lens element 120.

The third lens element 130 may have negative refracting power, which may be constructed by plastic material. The object-side surface 131 is a concave surface, and the image-side surface 132 is a convex surface.

The fourth lens element 140 may have positive refracting power, which may be constructed by plastic material. The object-side surface 141 is a concave surface, and the image-side surface 142 is a convex surface. The object-side surface 141 has a concave portion 1412 in a vicinity of a periphery of the fourth lens element 140.

The fifth lens element 150 may have negative refracting power, which may be constructed by plastic material. The object-side surface 151 is a concave surface. The image-side surface 152 has a concave portion 1521 in a vicinity of the optical axis and a convex portion 1522 in a vicinity of a periphery of the fifth lens element 150.

In example embodiments, air gaps exist between the lens elements 110, 120, 130, 140, 150, the filtering unit 160, and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the filtering unit 160, and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by $AGL_{12}$, the air gap d3 is denoted by $AGL_{34}$, and the sum of all air gaps d1,d2,d3,d4 between the first and fifth lens elements 110, 150 is denoted by AAG.

FIG. 4 depicts the optical characters of each lens elements in the optical imaging lens 1 of the present embodiment, wherein the values of $AAG/CT_5$, $AGL_{23}$–$AGL_{45}$, EFL/ALT, $CT_4$/BFL, ALT/BFL and $CT_4/AGL_{23}$ are:

$(AAG/CT_5)=3.104$, satisfying equation (1);

$(AGL_{23}-AGL_{45})=0.250$ (mm), satisfying equation (2);

$(EFL/ALT)=2.006$, satisfying equation (3),(3');

$(CT_4/BFL)=0.414$, satisfying equation (4),(4');

$(ALT/BFL)=1.369$, satisfying equation (5),(5');

$(CT_4/AGL_{23})=1.268$, satisfying equation (6);

wherein the distance from the object-side convex surface 111 of the first lens element 110 to the image plane 170 is 4.876 (mm), and the length of the optical imaging lens 1 is shortened.

Please note that, in example embodiments, to clearly illustrate the structure of each lens element, only the part where light passes is shown. For example, taking the first lens element 110 as an example, FIG. 1 illustrates the object-side surface 111 and the image-side surface 112. However, when implementing each lens element of the present embodiment, a fixing part for positioning the lens elements inside the optical imaging lens 1 may be formed selectively. Based on the first lens element 110, please refer to FIG. 3, which illustrates the first lens element 110 further comprising a fixing part. Here the fixing part is not limited to a protruding part 113 extending from the object-side convex surface 111 and the image-side surface 112 for mounting the first lens element 110 in the optical imaging lens 1, and ideally, light will not pass through the protruding part 113.

The spherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, and the object-side surface 151 and the image-side surface 152 of the fifth lens element 150 are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

wherein,
R represents the radius of the surface of the lens element;
Z represents the depth of the spherical surface (the perpendicular distance between the point of the spherical surface at a distance Y from the optical axis and the tangent plane of the vertex on the optical axis of the spherical surface);
Y represents the perpendicular distance between the point of the spherical surface and the optical axis;
K represents a conic constant;
$a_i$ represents a spherical coefficient of $i^{th}$ level.

The values of each spherical parameter are shown in FIG. 5.

As illustrated in FIG. 2, the optical imaging lens 1 of the present example embodiment shows great characteristics in the longitudinal spherical aberration (a), astigmatism aberration in the sagittal direction (b), astigmatism aberration in the tangential direction (c), and distortion aberration (d). Therefore, according to above illustration, the optical imaging lens 1 of the example embodiment indeed achieves great optical performance and the length of the optical imaging lens 1 is effectively shortened.

Reference is now made to FIGS. 6-9. FIG. 6 illustrates an example cross-sectional view of an optical imaging lens 2 having five lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 211 for labeling the object-side surface of the first lens element 210, reference number 212 for labeling the image-side surface of the first lens element 210, etc.

As shown in FIG. 6, the optical imaging lens 2 of the present embodiment, in an order from an object side A1 to an image side A2, comprises an aperture stop 200 positioned in front of a first lens element 210, the first lens element 210, a second lens element 220, a third lens element 230, a fourth lens element 240, and a fifth lens element 250.

The differences between the second embodiment and the first embodiment are the radius, thickness of each lens element and the distance of each air gap, the transition of the refracting power and configuration of the concave/convex shape of the lens elements are similar to those in the first embodiment. Please refer to FIG. 8 for the optical characteristics of each lens elements in the optical imaging lens 2 of the present embodiment, wherein the values of $AAG/CT_5$, $AGL_{23}$–$AGL_{45}$, $EFL/ALT$, $CT_4/BFL$, $ALT/BFL$ and $CT_4/AGL_{23}$ are:

($AAG/CT_5$)=3.441, satisfying equation (1);

($AGL_{23}$–$AGL_{45}$)=0.050 (mm), satisfying equation (2);

($EFL/ALT$)=1.936, satisfying equation (3),(3');

($CT_4/BFL$)=0.439, satisfying equation (4),(4');

($ALT/BFL$)=1.408, satisfying equation (5),(5');

($CT_4/AGL_{23}$)=1.778, satisfying equation (6);

wherein the distance from the object side surface 211 of the first lens element 210 to the image plane 270 is 4.673 (mm) and the length of the optical imaging lens 2 is shortened.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
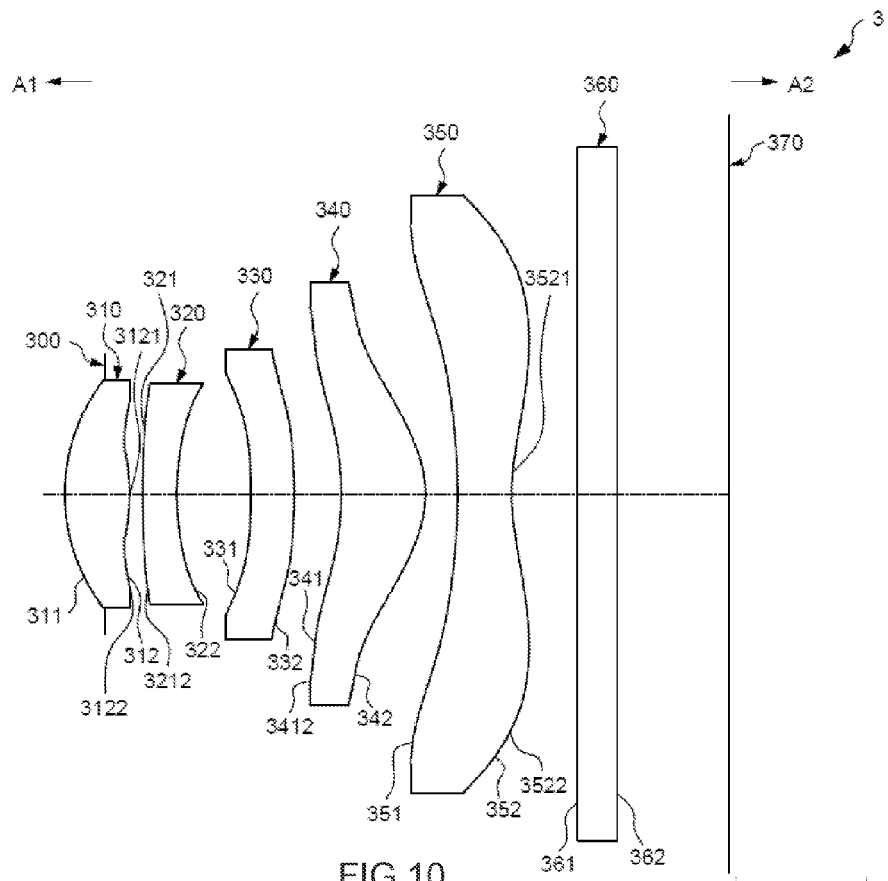
FIG. 10 is a cross-sectional view of a third embodiment of an optical imaging lens having five lens elements according to the present disclosure.
Figure 11:
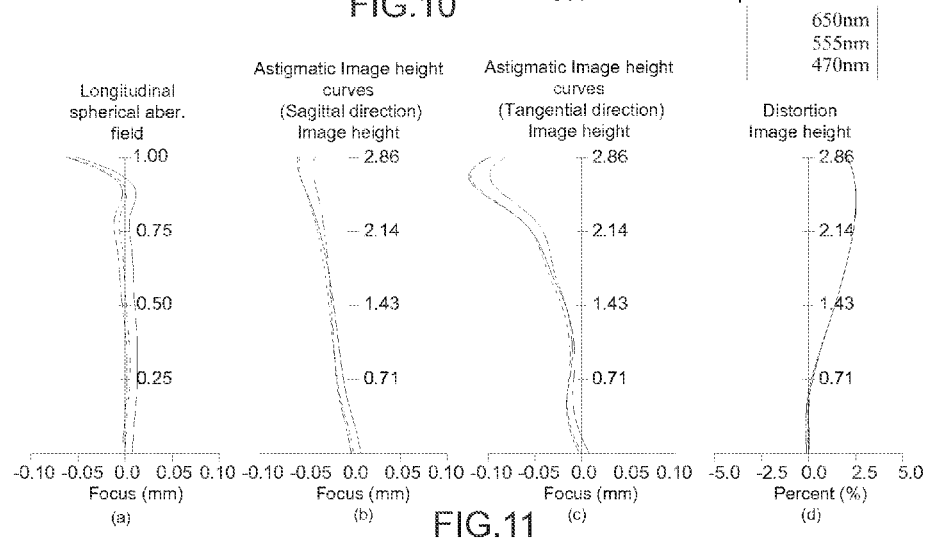
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having five lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of a spherical data of the optical imaging lens 3 according to the third example embodiment. The reference numbers labeled in the present embodiment are similar to those in the first embodiment for the similar elements, but here the reference numbers are initialed with 3, for example, reference number 311 for labeling the object-side surface of the first lens element 310, reference number 312 for labeling the image-side surface of the first lens element 310, etc.

As shown in FIG. 10, the optical imaging lens 3 of the present embodiment, in an order from an object side A1 to an image side A2, comprises an aperture stop 300 positioned in front of a first lens element 310, the first lens element 310, a second lens element 320, a third lens element 330, a fourth lens element 340, and a fifth lens element 350.

The differences between the third embodiment and the first embodiment are the image-side surface 312 of the first lens element 310, which having a convex portion 3121 in a vicinity of the optical axis and a concave portion 3122 in a vicinity of a periphery of the first lens element 310, and also the thickness of each lens element and the distance of each air gap. Please refer to FIG. 12 for the optical characteristics of each lens elements in the optical imaging lens 3 of the present embodiment, wherein the values of $AAG/CT_5$, $AGL_{23}$–$AGL_{45}$, $EFL/ALT$, $CT_4/BFL$, $ALT/BFL$ and $CT_4/AGL_{23}$ are:

($AAG/CT_5$)=3.100, satisfying equation (1);

($AGL_{23}$–$AGL_{45}$)=0.320 (mm), satisfying equation (2);

(EFL/ALT)=1.994, satisfying equation (3),(3');

(CT$_4$/BFL)=0.427, satisfying equation (4),(4');

(ALT/BFL)=1.423, satisfying equation (5),(5');

(CT$_4$/AGL$_{23}$)=1.132, satisfying equation (6);

wherein the distance from the object side surface 311 of the first lens element 310 to the image plane 370 is 4.908 (mm) and the length of the optical imaging lens 3 is shortened.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 3 is effectively shortened.

Figure 14:
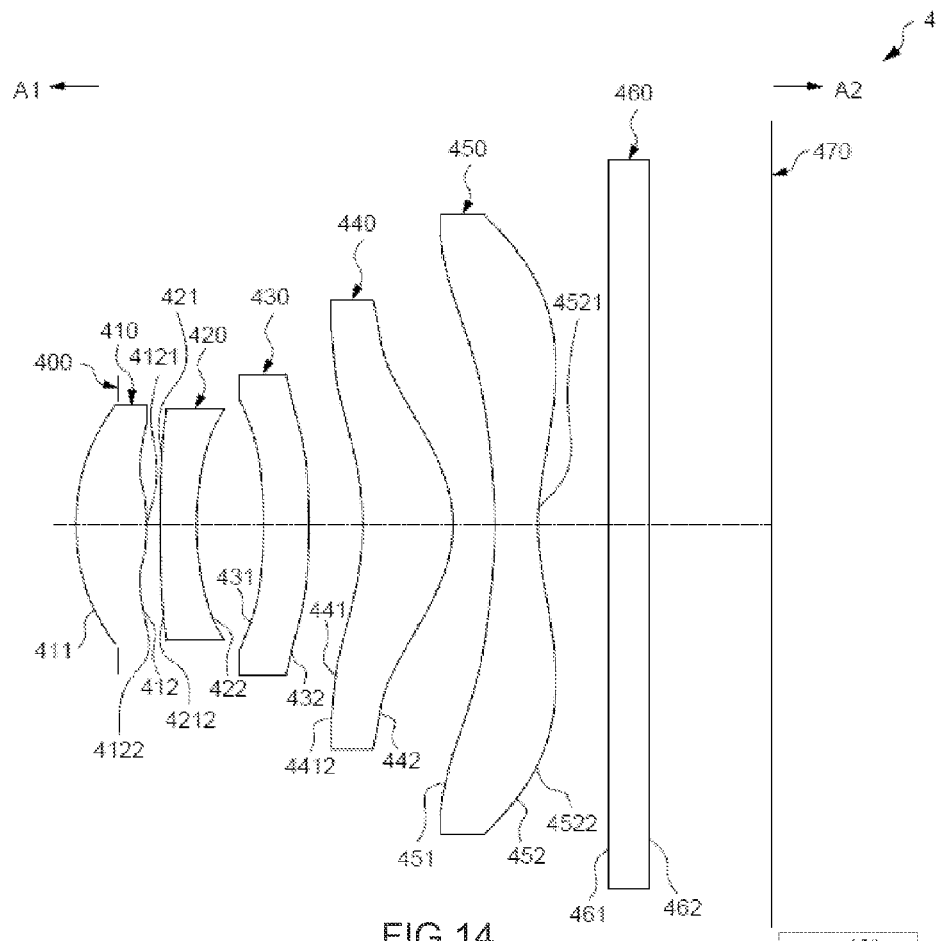
FIG. 14 is a cross-sectional view of a fourth embodiment of an optical imaging lens having five lens elements according to the present disclosure.
Figure 15:
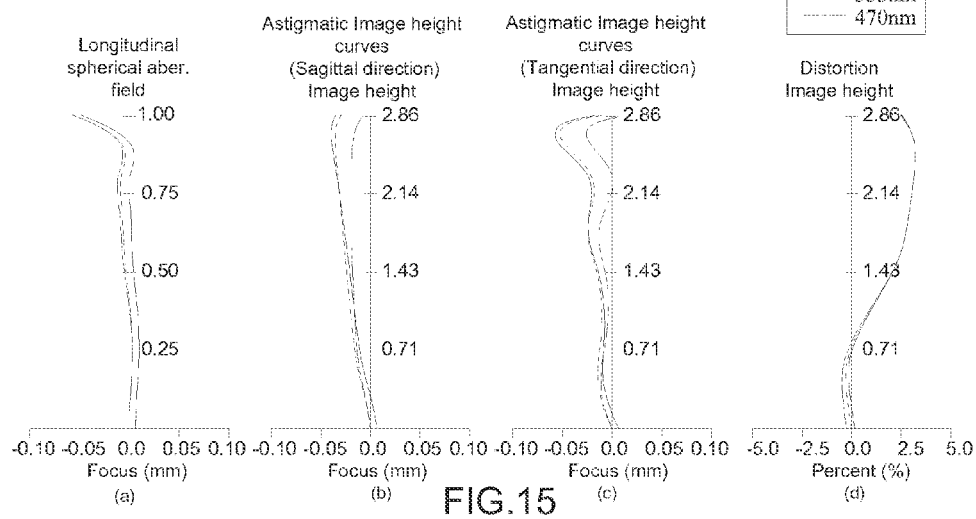
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having five lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of a spherical data of the optical imaging lens 4 according to the fourth example embodiment. The reference numbers labeled in the present embodiment are similar to those in the first embodiment for the similar elements, but here the reference numbers are initialed with 4, for example, reference number 411 for labeling the object-side surface of the first lens element 410, reference number 412 for labeling the image-side surface of the first lens element 410, etc.

As shown in FIG. 14, the optical imaging lens 4 of the present embodiment, in an order from an object side A1 to an image side A2, comprises an aperture stop 400 positioned in front of a first lens element 410, the first lens element 410, a second lens element 420, a third lens element 430, a fourth lens element 440, and a fifth lens element 450.

The differences between the fourth embodiment and the third embodiment are the radius and thickness of each lens element and the distance of each air gap, but the transition of the refracting power and configuration of the concave/convex shape of the lens elements are similar to those in the third embodiment. Please refer to FIG. 16 for the optical characteristics of each lens elements in the optical imaging lens 4 of the present embodiment, wherein the values of AAG/CT$_5$, AGL$_{23}$–AGL$_{45}$, EFL/ALT, CT$_4$/BFL, ALT/BFL and CT$_4$/AGL$_{23}$ are:

(AAG/CT$_5$)=4.098, satisfying equation (1);

(AGL$_{23}$–AGL$_{45}$)=0.182 (mm), satisfying equation (2);

(EFL/ALT)=2.054, satisfying equation (3),(3');

(CT$_4$/BFL)=0.423, satisfying equation (4),(4');

(ALT/BFL)=1.338, satisfying equation (5),(5');

(CT$_4$/AGL$_{23}$)=1.351, satisfying equation (6);

wherein the distance from the object side surface 411 of the first lens element 410 to the image plane 470 is 4.854 (mm) and the length of the optical imaging lens 4 is shortened.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 4 is effectively shortened.

Figure 18:
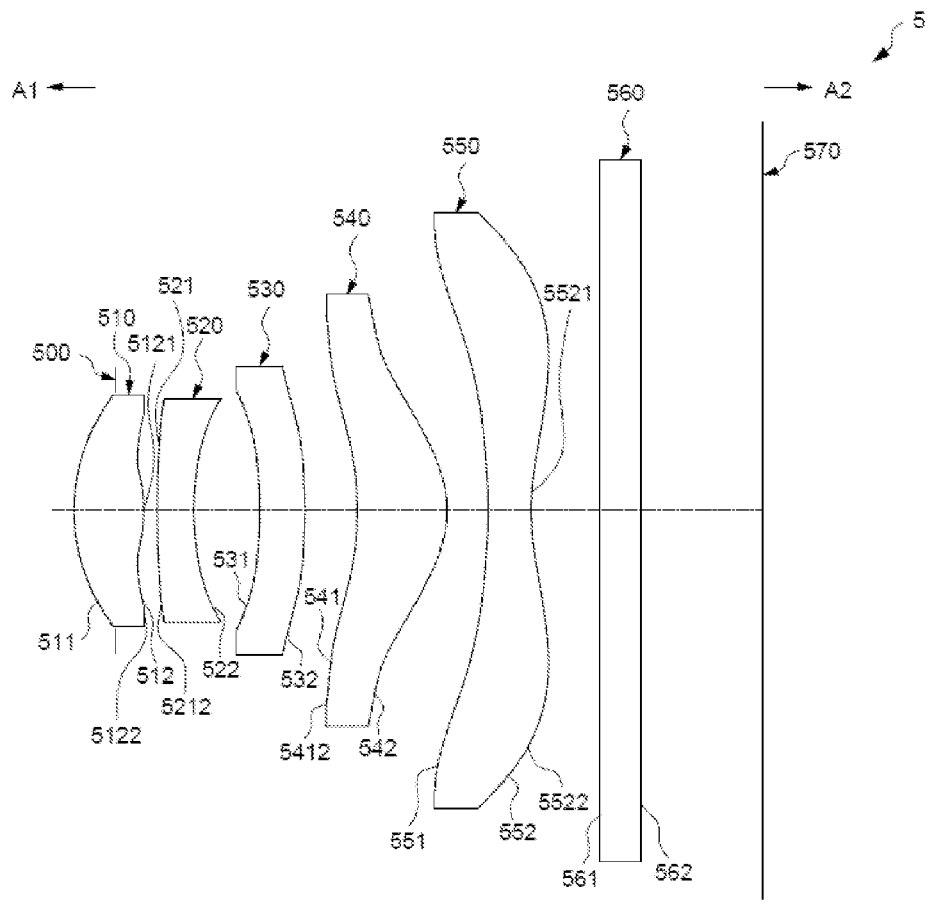
FIG. 18 is a cross-sectional view of a fifth embodiment of an optical imaging lens having five lens elements according to the present disclosure.
Figure 19:
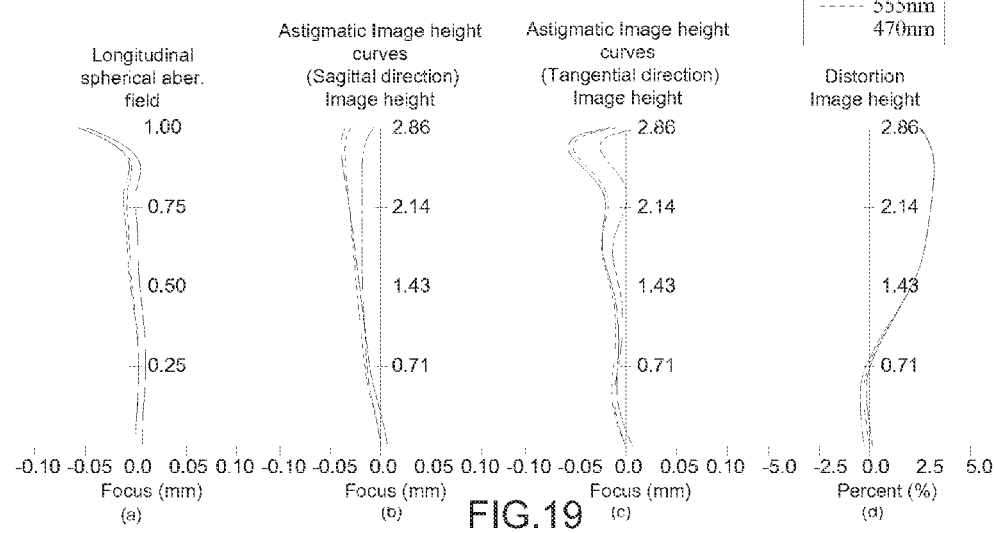
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having five lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of a spherical data of the optical imaging lens 5 according to the fifth example embodiment. The reference numbers labeled in the present embodiment are similar to those in the first embodiment for the similar elements, but here the reference numbers are initialed with 5, for example, reference number 511 for labeling the object-side surface of the first lens element 510, reference number 512 for labeling the image-side surface of the first lens element 510, etc.

As shown in FIG. 18, the optical imaging lens 5 of the present embodiment, in an order from an object side A1 to an image side A2, comprises an aperture stop 500 positioned in front of a first lens element 510, the first lens element 510, a second lens element 520, a third lens element 530, a fourth lens element 540, and a fifth lens element 550.

The differences between the fifth embodiment and the third embodiment are the radius, thickness of each lens element, and the distance of each air gap, but the transition of the refracting power and the configuration of the concave-convex shape of the lens elements are similar to those in the third embodiment. Please refer to FIG. 20 for the optical characteristics of each lens elements in the optical imaging lens 5 of the present embodiment, wherein the values of AAG/CT$_5$, AGL$_{23}$–AGL$_{45}$, EFL/ALT, CT$_4$/BFL, ALT/BFL and CT$_4$/AGL$_{23}$ are:

(AAG/CT$_5$)=4.084, satisfying equation (1);

(AGL$_{23}$–AGL$_{45}$)=0.182 (mm), satisfying equation (2);

(EFL/ALT)=2.053, satisfying equation (3),(3');

(CT$_4$/BFL)=0.423, satisfying equation (4),(4');

(ALT/BFL)=1.339, satisfying equation (5),(5');

(CT$_4$/AGL$_{23}$)=1.352, satisfying equation (6);

wherein the distance from the object side surface 511 of the first lens element 510 to the image plane 570 is 4.853 (mm) and the length of the optical imaging lens 5 is shortened.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
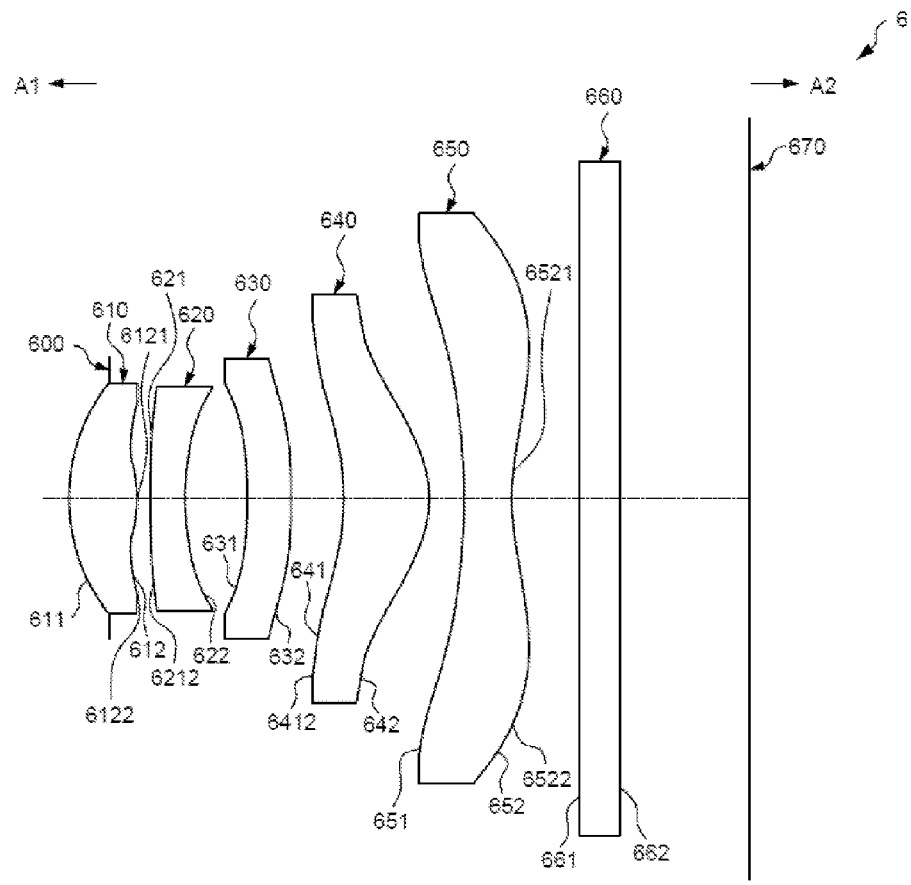
FIG. 22 is a cross-sectional view of a sixth embodiment of an optical imaging lens having five lens elements according to the present disclosure.
Figure 23:
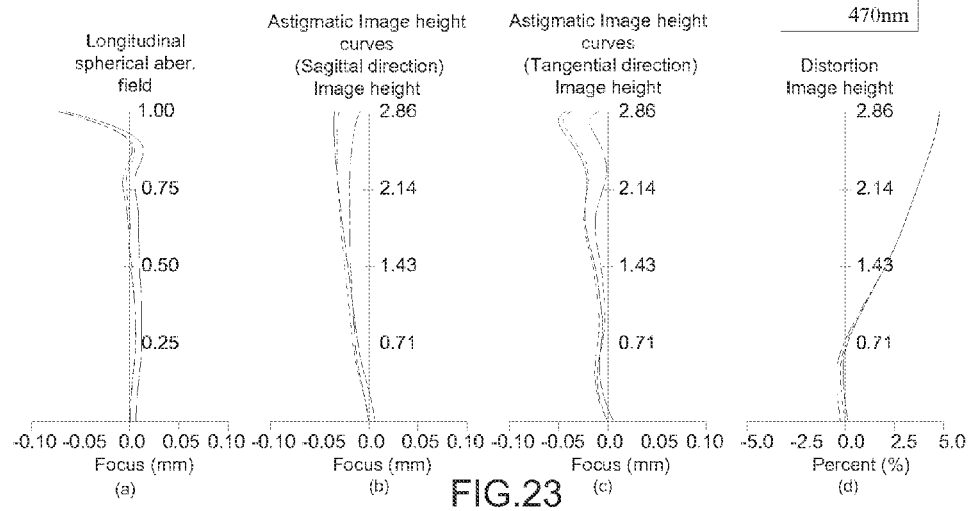
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having five lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of a spherical data of the optical imaging lens 6 according to the sixth example embodiment. The reference numbers labeled in the present embodiment are similar to those in the first embodiment for the similar elements, but here the reference numbers are initialed with 6, for example, reference number 611 for labeling the object-side surface of the first lens element 610, reference number 612 for labeling the image-side surface of the first lens element 610, etc.

As shown in FIG. 22, the optical imaging lens 6 of the present embodiment, in an order from an object side A1 to an image side A2, comprises an aperture stop 600 positioned in front of a first lens element 610, the first lens element 610, a second lens element 620, a third lens element 630, a fourth lens element 640, and a fifth lens element 650.

The differences between the sixth embodiment and the third embodiment are the thickness of each lens element and the distance of each air gap, but the transition of the refracting power and configuration of the concave/convex shape of the lens elements are similar to those in the third embodiment. Please refer to FIG. 24 for the optical characteristics of each lens elements in the optical imaging lens 6 of the present embodiment, wherein the values of $AAG/CT_5$, $AGL_{23}-AGL_{45}$, EFL/ALT, $CT_4$/BFL, ALT/BFL and $CT_4/AGL_{23}$ are:

$(AAG/CT_5)$=3.415, satisfying equation (1);

$(AGL_{23}-AGL_{45})$=0.201 (mm), satisfying equation (2);

(EFL/ALT)=2.050, satisfying equation (3),(3');

$(CT_4/BFL)$=0.397, satisfying equation (4),(4');

(ALT/BFL)=1.297, satisfying equation (5),(5');

$(CT_4/AGL_{23})$=1.374, satisfying equation (6);

wherein the distance from the object side surface 611 of the first lens element 610 to the image plane 670 is 4.926 (mm) and the length of the optical imaging lens 6 is shortened.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Please refer to FIG. 26, which shows the values of $AAG/CT_5$, $AGL_{23}-AGL_{45}$, EFL/ALT, $CT_4$/BFL, ALT/BFL and $CT_4/AGL_{23}$ of all six embodiments, and it is clear that the optical imaging lens of the present invention satisfy the Equations (1), (2), (3)/(3'), (4)/(4'), (5)/(5'), (6).

Figure 27:
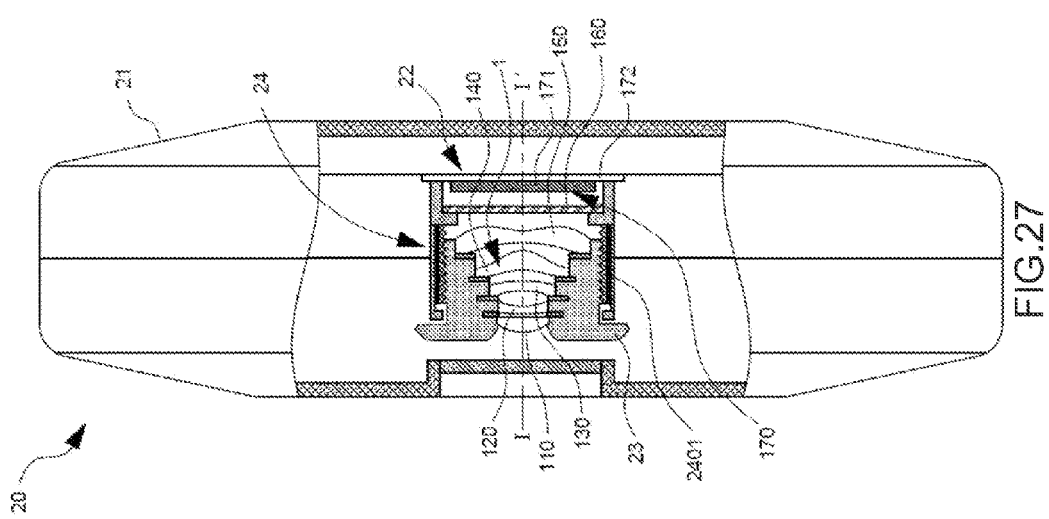
FIG. 27 is a structure of an example embodiment of a mobile device.

Reference is now made to FIG. 27, which illustrates an example structural view of a first embodiment of mobile device 20 applying an aforesaid optical imaging lens. The mobile device 20 comprises a housing 21 and a photography module 22 positioned in the housing 21. An example of the mobile device 20 may be, but is not limited to, a mobile phone.

As shown in FIG. 27, the photography module 22 may comprise an aforesaid optical imaging lens with five lens elements, for example the optical imaging lens 1 of the first embodiment, a lens barrel 23 for positioning the optical imaging lens 1, a module housing unit 24 for positioning the lens barrel 23, a substrate 172 for positioning the module housing unit 24, and an image sensor 171 which is positioned at an image side of the optical imaging lens 1. The image plane 170 is formed on the image sensor 171.

In some other example embodiments, the structure of the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

The five lens elements 110, 120, 130, 140, 150 are positioned in the lens barrel 23 in the way of separated by an air gap between any two adjacent lens elements.

The module housing unit 24 comprises a seat element 2401 for positioning the lens barrel 23. The lens barrel 23 and the seat element 2401 are positioned along a same axis I-I', and the lens barrel 23 is positioned inside the seat element 2401.

Because the length of the optical imaging lens 1 is merely 4.876 (mm), the size of the mobile device 20 may be quite small. Therefore, the embodiments described herein meet the market demand for smaller sized product designs.

Figure 28:
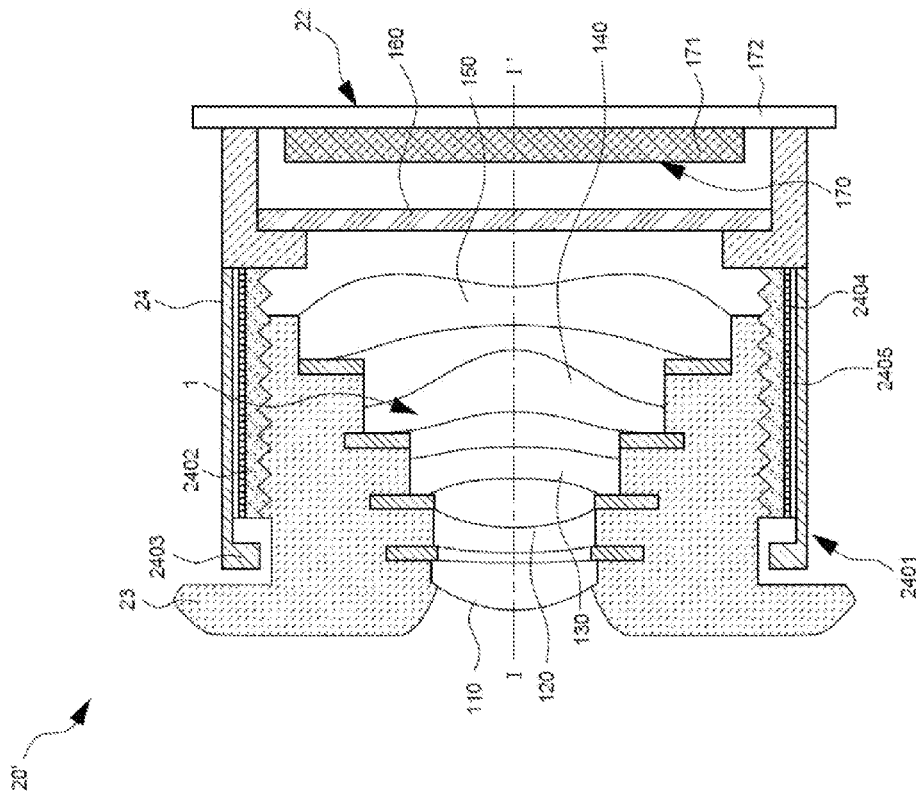
FIG. 28 is a partially enlarged view of the structure of another example embodiment of a mobile device.

Reference is now made to FIG. 28, which shows another structural view of a second embodiment of mobile device 20' applying the aforesaid optical imaging lens 1 . One difference between the mobile device 20' and the mobile device 20 may be the seat element 2401 comprises a first seat unit 2402, a second seat unit 2403, a coil 2404, and a magnetic unit 2405. Here, the second seat unit 2403 of the seat element 2401 could move along the optical axis of the optical imaging lens 1 . Please refer to the details as follows. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1, 4.876 (mm), is shortened, the mobile device 20' may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling ratio of at least one central thickness of lens element to a sum of all air gaps along the optical axis between five lens elements in a predetermined range, and incorporated with detail structure and/or reflection power of the lens elements, the length of the optical imaging lens is effectively shortened and meanwhile good optical characters are still provided.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side, comprising first, second, third, fourth and fifth lens elements, each of said first, second, third, fourth and fifth lens elements having an object-side surface facing toward the object side and an image-side surface facing toward the image side, wherein:
   said first lens element has positive refracting power;
   said image-side surface of said second lens element comprises a concave portion in a vicinity of the optical axis;
   said object-side surface of said third lens element comprises a concave portion in the vicinity of the optical axis;
   said image-side surface of said fourth lens element comprises a convex portion in the vicinity of the optical axis;
   said image-side surface of said fifth lens element comprises a concave portion in the vicinity of the optical axis, and said image-side surface of said fifth lens element comprises a convex portion in the vicinity of a periphery of the fifth lens element;
   a central thickness of the fourth lens element along the optical axis is $CT_4$, an air gap between the third lens element and the fourth lens element along the optical axis is $AGL_{34}$, and $CT_4$ and $AGL_{34}$ satisfy the equation: $CT_4/AGL_{34} \leq 2.00$; and
   the optical imaging lens as a whole has only the five lens elements having refracting power.

2. The optical imaging lens according to claim 1, wherein a distance between said object-side surface of said first lens element and an image plane along the optical axis is TTL, an air gap between the fourth lens element and the fifth lens element along the optical axis is $AGL_{45}$, and TTL and $AGL_{45}$ satisfy the equation:

$14.93 \leq TTL/AGL_{45} \leq 19.98.$

3. The optical imaging lens according to claim 2, wherein a central thickness of the fifth lens element along the optical axis is $CT_5$, and TTL and $CT_5$ satisfy the equation:

$11.95 \leq TTL/CT_5 \leq 15.74.$

4. The optical imaging lens according to claim 3, wherein an air gap between the second lens element and the third lens element along the optical axis is $AGL_{23}$, and TTL and $AGL_{23}$ satisfy the equation:

$8.68 \leq TTL/AGL_{23} \leq 12.88.$

5. The optical imaging lens according to claim 1, wherein an air gap between the first lens element and the second lens element along the optical axis is $AGL_{12}$, and TTL and $AGL_{12}$ satisfy the equation:

$46.73 \leq TTL/AGL_{12} \leq 49.26.$

6. The optical imaging lens according to claim 5, wherein a sum of thicknesses of all five lens elements along the optical axis is ALT, an air gap between the fourth lens element and the fifth lens element along the optical axis is $AGL_{45}$, and ALT and $AGL_{45}$ satisfy the equation:

$6.62 \leq ALT/AGL_{45} \leq 8.69.$

7. The optical imaging lens according to claim 6, wherein an air gap between the second lens element and the third lens element along the optical axis is $AGL_{23}$, an air gap between the first lens element and the second lens element along the optical axis is $AGL_{12}$, and $AGL_{23}$ and $AGL_{12}$ satisfy the equation:

$3.63 \leq AGL_{23}/AGL_{12} \leq 5.66.$

8. The optical imaging lens according to claim 1, wherein a back focal length of the optical imaging lens is BFL, an air gap between the fourth lens element and the fifth lens element along the optical axis is $AGL_{45}$, and BFL and $AGL_{45}$ satisfy the equation:

$4.70 \leq BFL/AGL_{45} \leq 6.11.$

9. The optical imaging lens according to claim 8, wherein a sum of thicknesses of all five lens elements along the optical axis is ALT, an air gap between the second lens element and the third lens element along the optical axis is $AGL_{23}$, and ALT and $AGL_{23}$ satisfy the equation:

$3.77 \leq ALT/AGL_{23} \leq 5.71.$

10. The optical imaging lens according to claim 9, wherein a central thickness of the fifth lens element along the optical axis is $CT_5$, and ALT and $CT_5$ satisfy the equation:

$5.20 \leq ALT/CT_5 \leq 6.66.$

11. The optical imaging lens according to claim 1, wherein a back focal length of the optical imaging lens is BFL, a central thickness of the fifth lens element along the optical axis is $CT_5$, and BFL and $CT_5$ satisfy the equation:

$3.5 \leq BFL/CT_5 \leq 4.98.$

12. The optical imaging lens according to claim 11, wherein a sum of all four air gaps from the first lens element to the fifth lens element along the optical axis is AAG, an air gap between the fourth lens element and the fifth lens element along the optical axis is $AGL_{45}$, and AAG and $AGL_{45}$ satisfy the equation:

$3.61 \leq AAG/AGL_{45} \leq 5.18.$

13. The optical imaging lens according to claim 11, wherein the sum of all four air gaps from the first lens element to the fifth lens element along the optical axis is AAG, an air gap between the first lens element and the second lens element along the optical axis is $AGL_{12}$, and AAG and $AGL_{12}$ satisfy the equation:

$11.31 \leq AAG/AGL_{12} \leq 12.73.$

14. The optical imaging lens according to claim 1, wherein a back focal length of the optical imaging lens is BFL, an air gap between the second lens element and the third lens element along the optical axis is $AGL_{23}$, and BFL and $AGL_{23}$ satisfy the equation:

$2.65 \leq BFL/AGL_{23} \leq 4.05$.

15. The optical imaging lens according to claim 14, wherein a back focal length of the optical imaging lens is BFL, an air gap between the first lens element and the second lens element along the optical axis is $AGL_{12}$, and BFL and $AGL_{12}$ satisfy the equation:

$14.71 \leq BFL/AGL_{12} \leq 16.13$.

16. The optical imaging lens according to claim 14, wherein a sum of all four air gaps from the first lens element to the fifth lens element along the optical axis is AAG, a central thickness of the fifth lens element along the optical axis is $CT_5$, and AAG and $CT_5$ satisfy the equation:

$3.10 \leq AAG/CT_5 \leq 4.10$.

17. The optical imaging lens according to claim 1, wherein a central thickness of the fifth lens element along the optical axis is $CT_5$, an air gap between the first lens element and the second lens element along the optical axis is $AGL_{12}$, and $CT_5$ and $AGL_{12}$ satisfy the equation:

$3.08 \leq CT_5/AGL_{12} \leq 4.11$.

18. The optical imaging lens according to claim 17, wherein a distance between said object-side surface of said first lens element and an image plane along the optical axis is TTL, and TTL and $AGL_{34}$ satisfy the equation:

$12.62 \leq TTL/AGL_{34} \leq 13.56$.

19. The optical imaging lens according to claim 18, wherein an air gap between the second lens element and the third lens element along the optical axis is $AGL_{23}$, an air gap between the fourth lens element and the fifth lens element along the optical axis is $AGL_{45}$, and $AGL_{23}$ and $AGL_{45}$ satisfy the equation:

$1.16 \leq AGL_{23}/AGL_{45} \leq 2.30$.

20. The optical imaging lens according to claim 19, wherein a central thickness of the second lens element along the optical axis is $CT_2$, and TTL and $CT_2$ satisfy the equation:

$17.97 \leq TTL/CT_2 \leq 18.95$.

* * * * *